United States Patent [19]

Cragun et al.

[11] Patent Number: 5,504,675
[45] Date of Patent: Apr. 2, 1996

[54] METHOD AND APPARATUS FOR AUTOMATIC SELECTION AND PRESENTATION OF SALES PROMOTION PROGRAMS

[75] Inventors: Brian J. Cragun; Todd M. Kelsey, both of Rochester, Minn.; Stephen H. Lund, Boulder, Colo.

[73] Assignee: International Business Machines Corporation, Armonk, N.Y.

[21] Appl. No.: 363,195

[22] Filed: Dec. 22, 1994

[51] Int. Cl.⁶ ..................................................... G06F 17/60
[52] U.S. Cl. ...................... 364/401; 364/400; 340/825.33
[58] Field of Search .................................... 364/400, 401, 364/405, 479; 340/825.33, 825.35, 541; 235/379, 380; 395/2.68, 2.79, 2.83, 23, 925

[56] References Cited

U.S. PATENT DOCUMENTS

| | | | |
|---|---|---|---|
| 4,630,108 | 12/1986 | Gomersall | 358/84 |
| 4,908,761 | 3/1990 | Tai | 364/401 |
| 4,930,077 | 5/1990 | Fan | 364/419 |
| 5,057,915 | 10/1991 | Von Kohorn | 358/84 |
| 5,124,911 | 6/1992 | Sack | 364/401 |
| 5,305,197 | 4/1995 | Axler et al. | 364/401 |
| 5,408,417 | 4/1995 | Wilder | 364/479 |

OTHER PUBLICATIONS

Rouland, "Multimedia Technology: Systems For the Senses", Discount Merchandiser v32n4 pp: 32, 35, 72, Apr. 1992 Coden: DISMAD.
Meckler Corp., "Update on Interactive Videodisc Kiosks, Optical Information Systems Update", Jun. 1988.
The (New) Turing Omnibus by A. K. Dewdney, W. H. Freeman and Company (1993) at pp. 181–187 and 241–249.

*Primary Examiner*—Gail O. Hayes
*Assistant Examiner*—Frantzy Poinvil
*Attorney, Agent, or Firm*—Baker, Maxham, Jester & Meador

[57] ABSTRACT

A sales promotion program is dynamically selected from a plurality of programs for presentation in a program presentation unit by a neural network that makes its selection based on first detecting if a person is in the area immediately around the program presentation unit, then either selecting a general attract loop sales promotion program with the trained neural network using a set of predetermined system criteria if no person is detected in the immediate area or selecting a specific loop sales promotion program if at least one person is detected in the immediate area. The neural network is trained by selecting general attract loop programs that are run and then collecting data indicative of the number of persons responding to the general attract loop and also by selecting specific loop programs that are run if a person is in the immediate area and then collecting data indicative of the responses to the specific loop programs. The collected data thereby represents the success of the various sales programs in attracting and holding the attention of persons. The collected data is provided to the neural network in any one of a plurality of training schemes typical for neural networks, after which the trained neural network is provided with current, real-time selection data such that the trained network can select the most appropriate sales promotion program for running. The network can be retrained at regular intervals or in response to sales data or changes in the collected data.

25 Claims, 8 Drawing Sheets

METHOD AND APPARATUS FOR AUTOMATIC SELECTION AND PRESENTATION OF SALES PROMOTION PROGRAMS

BACKGROUND OF THE INVENTION

1. Field of the Invention

This invention relates generally to the presentation of sales promotion programs and, more particularly, to automatic selection and presentation of sales promotion programs in real-time.

2. Description of the Related Art

Sales promotion programs deliver messages designed to motivate a message recipient to take a desired action, which typically is to make a product purchase. The goal of sales promotion programs is to attract the attention of persons who might take the desired action, hold their attention while the program is presented, and motivate such persons to take the desired action. Sales promotion programs include a variety of presentations, including, for example, commercial broadcast advertising spots on television and radio, in-store announcements over public address systems, vending machine presentations, and programs designed to operate in kiosk units.

Kiosk units are desirable because they can be placed in locations selected to have the greatest chance of attracting message recipients and are amenable to presenting multimedia programs that are more likely than static displays or verbal announcements to attract and hold attention. Kiosk units typically comprise audio and visual presentation devices housed in a structure that also contains a central processor that repeatedly runs one or more sales promotion programs. When the central processor runs a sales promotion program, the program contents are repeatedly presented over the audio and visual devices so they can be heard and seen by persons in the immediate area of the kiosk. Frequently, the kiosks will include a touch-screen device, which comprises a display screen that can detect when a person touches the screen and can identify which pan of the screen was touched. In this way, a passer-by can respond to the sales promotion program by touching the screen at indicated locations and control the presentation of the program. This permits a somewhat interactive exchange to be maintained between the passer-by and the program.

Touch-screen kiosk units enable sales promotion programs to include more complex logic so that a more intriguing operator interface can be presented, thus increasing the chances of attracting and holding the attention of a passer-by. The operator interface can permit greater interaction and greater entertainment. For example, a person interacting with the kiosk can respond to queries presented by the sales promotion program being presented. The responses to the queries can be used to select the next portion of the sales promotion program to be run or can be used to select a different program. A more intriguing operator interface is desired because empirical evidence suggests that programs that are more successful at attracting and holding the attention of persons also are more successful at motivating persons to take the desired action, such as making a purchase. Nevertheless, evidence suggests that complex decision-making purchase patterns exist, but are not always understood.

In general, it is difficult to develop a single program that can attract and hold the attention of the full range of potential passers-by. Many different factors have been found to influence the success of a sales promotion program and therefore to suggest the best program content. For example, the timing of the presentation as to time of day, week, year, and the like can influence the success of a program. Similarly, the geographic region, current local season or weather may influence the response of persons to a program. Thus, it has been found preferable to provide a number of sales promotion programs, each potentially having interactive features, that are adapted for different factors. Typically, a management decision is made as to which program is the best to be presented, given an expected set of influencing factors. Such decisions can be made weekly, intermittently as sales change, or according to some other timing consideration.

It is preferable to select sales promotion programs for presentation as a function of the programs whose performance indicates they work the best in attracting persons to respond. In the case of a kiosk unit with a touch-screen device, the selection of programs to be offered to passers-by typically is done by analyzing collected data comprising sales of the promoted products, the number of persons interacting with the touch-screen, a count of casual observers, or some combination of such performance characteristics. If a program that features a certain product is repeatedly presented or made available for presentation, and if sales of that product increase, then it is assumed there is a causal relationship between the program and the increased sales.

It would be advantageous to dynamically select the sales promotion programs to be presented and made available. The selection process logic as used in conventional kiosks, however, is necessarily decided upon before any input data is received. That is, the numerical relationships between data constructs are fixed and cannot be changed without reprogramming the kiosk processor. Over time, however, the numerical relationships between data could change. For example, a sales promotion program might be generally successful but, due to a transitory environmental phenomenon, might be temporarily marginal. If the selection process logic does not reflect the current data, developing complex patterns in the data could be missed or not understood. Reprogramming the kiosk processor enables current data to be accounted for, but reduces the availability of the kiosk unit and increases maintenance costs. Moreover, the volume of data to be analyzed to ensure reliable program selection in real time might require a relatively powerful processor for a kiosk implementation, increasing unit cost.

The difficulties described above can overcome many of the advantages otherwise provided by kiosks. It should be apparent that there is a need for a system that permits real-time selection of sales promotion programs for presentation and availability to passers-by based on current contributing conditions. The present invention satisfies this need.

SUMMARY OF THE INVENTION

In accordance with the invention, a program presentation unit central processor automatically selects a sales promotion program from among a plurality of programs using a neural network that generates an output data set indicating which one of the sales promotion programs has the greatest likelihood of success in arousing the interest of passersby in the immediate area of the program presentation unit. The central processor trains the neural network during a training mode by selecting sales promotion programs for presentation and collecting data indicative of contributing conditions and the responses to the presented programs. The collected data thereby represents the success of the various sales programs in attracting and holding the attention of persons who are exposed to the presentations and determines neural network weighting functions. After completion of the training mode, the trained neural network is provided with data relating to current, real-time selection criteria, such that the processor can use the trained network to select the sales promotion program for presentation having the greatest likelihood of success in arousing the interest of passers-by in the immediate area of the program presentation unit. In this way, sales promotion programs are automatically selected for presentation to passers-by based on the response success of programs previously presented and based on the real-time selection criteria. The use of a neural network permits large amounts of complex, interrelated data to be automatically analyzed and decreases the likelihood of missing data patterns that indicate desirable changes in program selection.

In one aspect of the invention, the program presentation unit comprises a kiosk unit that includes a touch-screen display, which permits passers-by to interact with the kiosk unit. An interaction with the touch-screen display constitutes a successful presentation of a sales promotion program. Alternatively, an actual purchase is the success measure for a purchase-type kiosk. Data relating to the number of persons interacting with the display and associated purchase information comprises success data that is collected during the training scheme. After training, selection of the sales promotion program to be run is based on first detecting if a person is in the area immediately around the program presentation unit, then either selecting a general attract loop sales promotion program if no person is detected in the immediate area or selecting a specific loop sales promotion program if at least one person is detected in the immediate area. The selection of the particular program to be run is made in accordance with selection criteria that includes the number of persons in the immediate area and also dynamic, real-time factors. The real-time factors can include, for example, local time and weather conditions. If desired, the network can be retrained at regular intervals or in response to sales data or changes in the collected data.

Other features and advantages of the present invention should be apparent frown the following description of the preferred embodiment, which illustrates, by way of example, the principles of the invention.

DESCRIPTION OF THE PREFERRED EMBODIMENT

Figure 1:
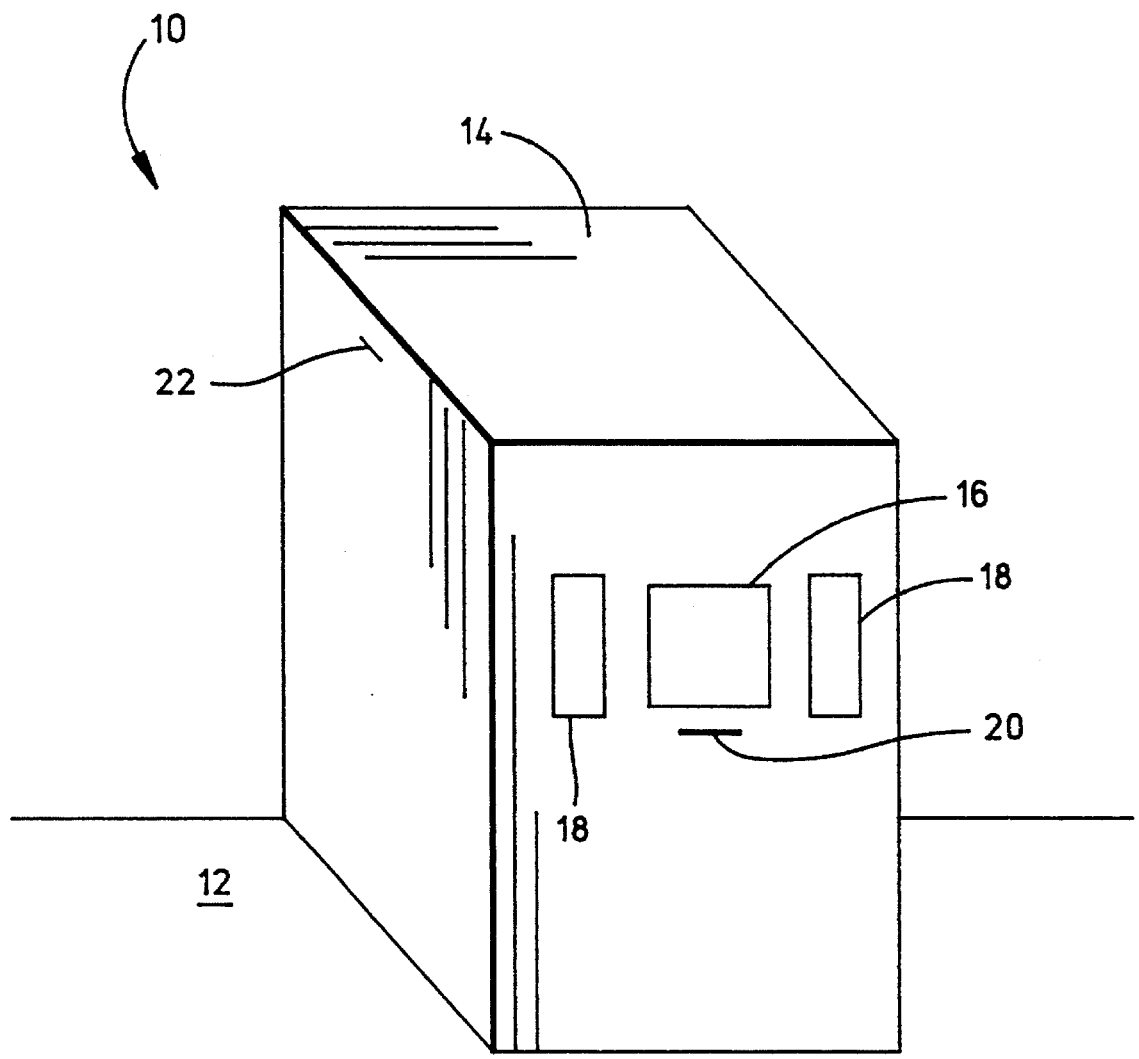
FIG. 1 is a view of a kiosk unit constructed in accordance with the present invention.

FIG. 1 shows a kiosk unit 10 constructed in accordance with the present invention and placed on a floor 12 in an area in which pedestrian traffic comprising passers-by will likely occur. The kiosk unit includes a housing 14 having a touch-screen display unit 16 and speakers 18 such that audio-visual multimedia sales programs can be presented to the passers-by. The kiosk unit includes one or more sensors 20, 22 that detect if persons are in the area around the kiosk unit 10. The kiosk unit includes a sales promotion program selection neural network that is trained and then is used to select sales promotion programs having the greatest likelihood of success in arousing the interest of passers-by in the immediate area of the kiosk unit for presentation.

Figure 2:
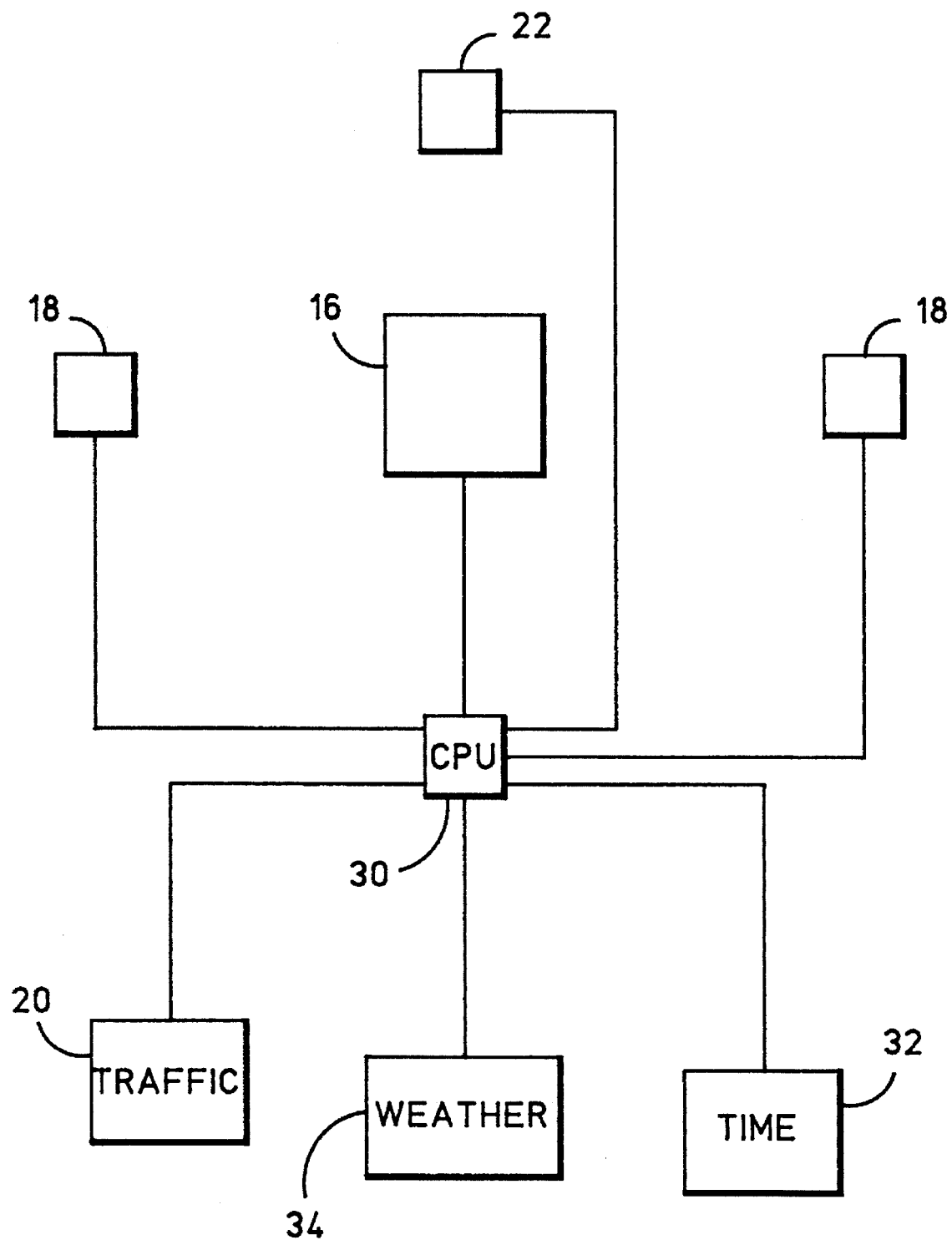
FIG. 2 is a block diagram of the kiosk unit illustrated in FIG. 1.

FIG. 2 is a block diagram that represents the processing elements of the kiosk unit 10. A central processing unit (CPU) 30 is coupled to the touch-screen display 16, speakers 18, and sensors 20 and 22. One of the sensors 20 is provided as a proximity sensor that detects persons in the immediate area around the kiosk and one of the sensors 22 is provided as a traffic sensor that counts the number of persons passing by the floor area close to the kiosk unit. Proximity sensors are well-known to those skilled in the an and can comprise, for example, sensors such as an Elkron Corp. Model MW 10 DO/12 microwave sensor and Radio Shack catalog number 49-550. Traffic sensors are also well-known and comprise, for example, an infrared photorelay sensor such as Radio Shack catalog number 49-551.

FIG. 2 shows that the CPU also is connected to timing circuits 32 from which the CPU receives information such as time of day, date, and the like and also is connected to a weather data monitor unit 34 from which the CPU receives information relating to the local weather conditions. Any weather data monitor unit compatible with the well-known RS-232 standard may be used. For example, the preferred embodiment uses a unit from Davis Instruments Co. called a "Weather Monitor II" with an optional rain gauge and software called "Weatherlink" to collect the weather data. Other sources for weather data also can be used, including an on-line service such as available over the "Internet" or manually entered data. The processing of the kiosk unit 10 is further illustrated in FIG. 3, which is a block diagram of the CPU 30.

Figure 3:
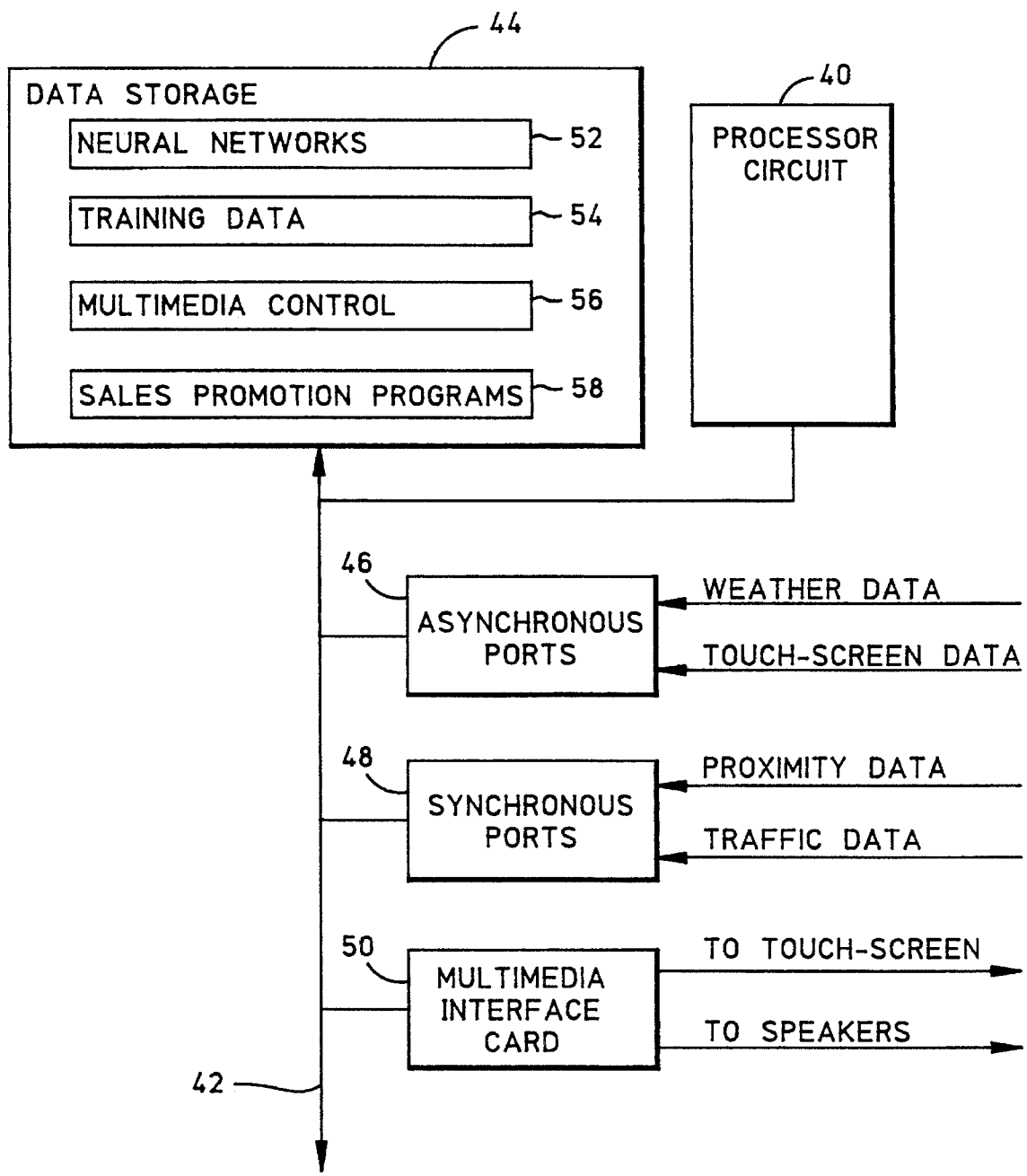
FIG. 3 is a block diagram of the processor of the kiosk unit illustrated in FIG. 1.

The block diagram of FIG. 3 shows that the CPU 30 includes a processor circuit 40 that is connected to a variety of hardware elements by a data bus 42. The hardware elements include, for example, a data storage unit 44, asynchronous ports 46, synchronous ports 48, and a multimedia interface circuit card 50. The asynchronous ports typically receive information from elements such as the weather data circuits 24 and the touch-screen display 16. The synchronous ports typically receive signals from the traffic sensor 22 and proximity sensor 20. The multimedia interface circuit card provides signals to the touch-screen display 16 and the speakers 18.

The data storage unit 44 can comprise a variety of storage units, including random access memory (RAM), a magnetic disk storage unit such as a hard disk, a network memory unit, or the like. The data storage unit contains a number of data structures including operating programs and applications programs. These data structures include, for example, a neural network 52, neural network training data 54, a multimedia control program 56, and sales promotion programs 58 comprising a variety of multimedia objects. Operation of the CPU 30 and the interaction of the various hardware elements illustrated in FIG. 2 will be better understood with reference to the following flow diagrams that illustrate the processing occurring within the kiosk unit 10.

Figure 4:
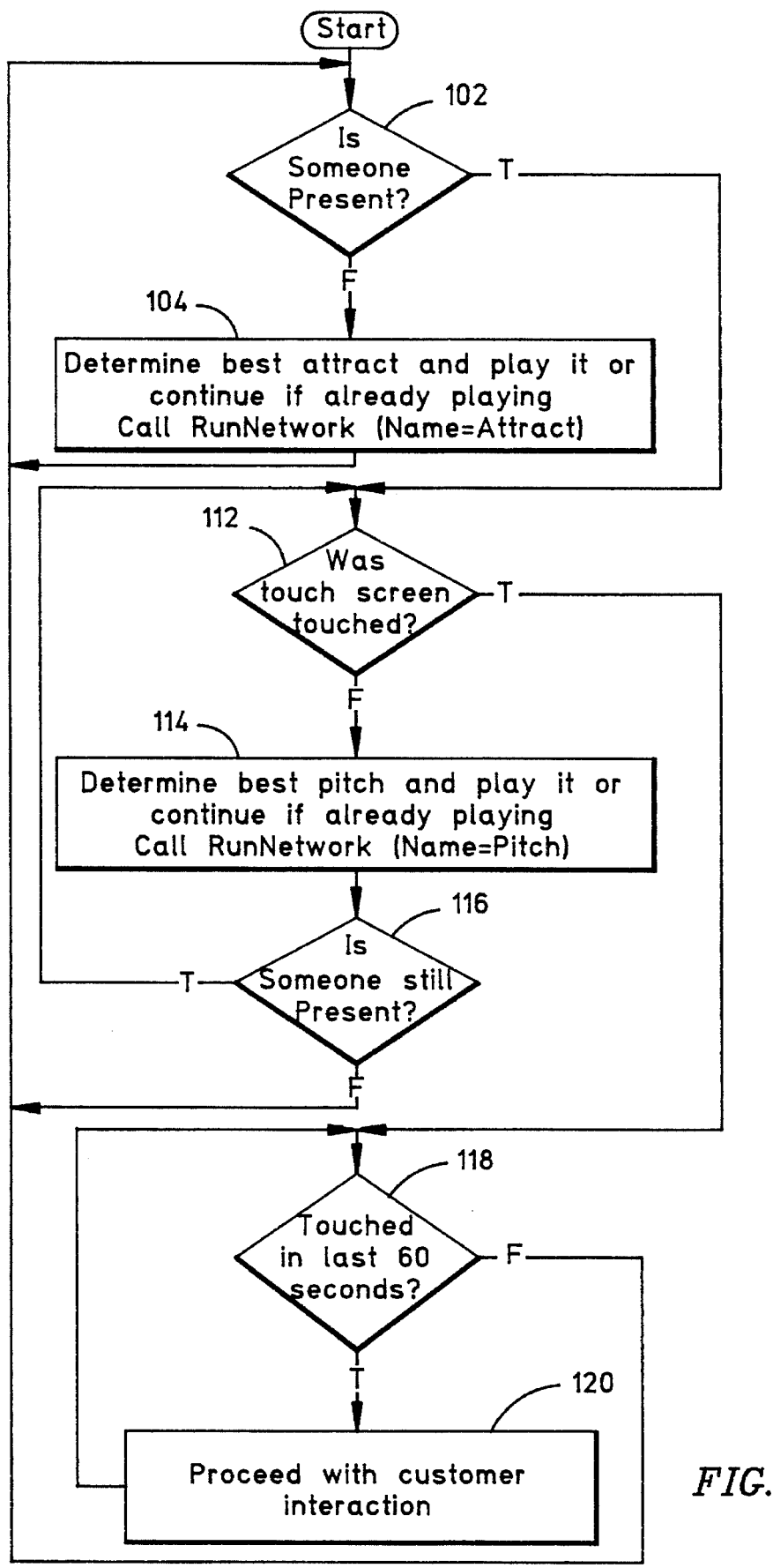
FIG. 4 is a flow diagram that represents the processing steps carried out by the processor illustrated in FIG. 2.

FIG. 4 illustrates the processing steps implemented by the processor 40 in running the neural network program 52 illustrated in FIG. 3 during a normal operating mode. At the start of processing, the processor first checks to determine if a person is in the immediate area of the kiosk unit, as represented by the decision box numbered 102. This information is provided by the proximity sensor. If no passer-by is in the immediate area, a "false" outcome at the decision box, then at the flow diagram box numbered 104, the neural network processor invokes an "attract" determining net program that determines the best attract loop sales promotion program, which is designed for attracting the attention of passers-by. An attract loop, for example, might have especially appealing visual images combined with a pleasant sound track or startling sounds.

After the presentation of the determined attract loop has begun, processing returns to the passer-by detection step 102. If a passer-by has been attracted to the area immediately around the kiosk unit, a "true" outcome at the decision box 102, then at the decision box numbered 112 the neural network processor monitors the touch-screen display to determine if the touch-screen was touched during the presentation of the attract loop. If the touch-screen was not touched, a "false" outcome at the decision box 112, then the neutral network processor next determines the best specific loop program and runs it or continues to run the present program if the recommended best program is already being run. This action is indicated at the flow diagram box numbered 114. After the step of determining which specific loop program to run, the neural network processor next checks to determine if a passer-by is still present in the immediate area of the kiosk unit, as indicated by the decision box numbered 116. If no passer-by remains in the immediate area, a "false" outcome, then processing resumes at the passer-by detecting step 102. If a passer-by is still present in the immediate area of the kiosk unit, a "true" outcome at the decision box 116, then processing returns to the touch-screen detecting step 112.

At the touch-screen detecting step 112, if the screen was touched within a predetermined short time interval, a "true" outcome, then processing moves to determining if the interaction with the touch-screen occurred in the preceding sixty seconds, as indicated by the decision box numbered 118. If the interaction occurred in the preceding sixty seconds, then at the step represented by the flow diagram box numbered 120, the specific loop sales promotion program processing proceeds with the customer interaction indicated by the last touch. Interaction time limits other than sixty seconds can be selected, if desired. Those skilled in the an will understand that the specific loop program processing can include, for example, changing the display on the touch-screen in accordance with the touch-screen response of the passer-by. Typically, for example, the display on the touch-screen will ask a passer-by to select one of several display sequences by touching different areas of the touch-screen display. The processing represented by the box numbered 120 involves determining the area of the display that was touched and presenting the sequence indicated by the touched display area. At the decision box numbered 118, if the touch-screen interaction did not occur in the preceding sixty seconds, a "false" outcome that indicates a random interaction not likely motivated by the display, then processing returns to the passerby detecting step 102.

In the preferred embodiment, the kiosk processor advantageously uses a computer-implemented neural network to select sales promotion programs. The neural network used in the preferred embodiment has a feed-forward architecture using a back propagation learning algorithm. Other architectures also may be used. Such artificial neural networks are the result of attempting to model biological processes, including motor skills such as reaching or grasping objects and recognition behavior such as pattern completion or language syntax. Such biological processes have been best modelled by information systems in which various aspects of information in the system can influence (or modify), and can be influenced by, other aspects of information in the system. One set of information systems that exhibit such behavior are commonly referred to as parallel distributed processing models and are frequently used as the architecture for neural networks.

In a parallel distributed processing model, information processing takes place through interactions of simple processing elements that send excitatory and inhibitory signals to other processing elements. In a neural network, a data item is represented in numerical form and is presented to the neural network. In this context, the processing elements referred to as neurons can represent, for example, hypotheses about which sales promotion program is most likely to elicit viewer interaction given a weather season or which sales promotion program is most likely to attract viewers given a particular time of day. In the preferred embodiment, neural network architecture comprises a first group of input neurons, each of which are connected to one or more layers of intermediate neurons. The layers of intermediate neurons are connected together and ultimately to a layer of output neurons. Information is processed by the network as data flows from the input neurons, through the intermediate layers, and finally to the output neurons. Each neuron in one layer is connected to every neuron in adjacent layers.

Network architectural details depend on the particular assumptions made about the process being modelled and the learning paradigm to be followed. In the preferred embodiment, each neuron in a neural network operates such that it adds together all data it receives, multiplies the sum by the connection weights, and then provides the result to the neurons in the next layer. The summed data typically is modified, in a nonlinear fashion, before it is provided to the next layer. The function that modifies the summed data can be implemented, for example, as a sigmoidal function, which fits the range of summed data values within an interval from $-1$ to $+1$, which is represented as $[-1, +1]$. A variety of sigmoidal functions have been used in neural networks to provide the nonlinearity, among them hyperbolic tangent and arc tangent functions.

Thus, each of the processing units, or neurons, in a neural network has a time-dependent activation value that is operated on by a function to produce an output value. The output value is passed through connections and provided as input to the next layer of neurons. The connections between neurons are unidirectional, moving from the input layer through the intermediate layers and finally to the output layer. Each connection is associated with a number that provides a weighing function for the connection. The weighing function determines the amount of effect that a first neuron has on the information provided to a second neuron.

All of the inputs to a neuron processing unit are combined by an arithmetic operator, such as addition, and the combined inputs, along with the current activation value of the neuron, are operated on by an activation function to determine the new activation value of that neuron. Thus, each neuron in the neural network performs the relatively simple tasks of receiving input from its neighbors and computing an output value, which it sends to its neighbors. An advantage of neural network models is that the connection weighing functions are not fixed. That is, the neural connection weights can be modified as a function of what the model experiences. In this way, the system can learn and evolve.

The state of the neural network at any time can be represented by vectors, or matrices, that specify the activation values of the neurons. Because each neuron includes an output function that maps the current activation state to an output value, the current set of output values of the network can be represented by an output value vector. Typically, the output functions implement some type of threshold function in which a neuron has no affect on another neuron until the activation value of the neuron exceeds a predetermined value. Alternative output functions include the identity function, in which the output value is equal to the activation value, and stochastic functions, in which the output value is a probabilistic function of the activation value.

As noted above, the output from one neuron is connected to other neurons through weighted connections. A positive weight indicates what is referred to as an excitatory input and a negative weight indicates what is referred to as an inhibitory input. The set of connection weights also can be represented as a matrix of values. For example, the connections can be represented by a weight matrix W wherein a matrix element $w(i,j)$ represents the connection from a neuron $n_j$ to another neuron $n_i$. If the value of $w(i,j)$ is positive, then $n_j$ excites $n_i$. If $w(i,j)$ is negative, then $n_j$ inhibits $n_i$. The absolute value of $w(i,j)$ represents the strength of the connection. Other patterns of connectivity require different arrangements of weight matrices, and will occur to those skilled in the art.

The process of adjusting the connection weights is commonly referred to as training the neural network. In the training process, the set of weighing functions are initialized to starting values, which typically are zero or are randomly set within a predetermined range of values. Inputs are provided to the network and output values are determined. The output values are assessed for "success", which is defined according to the process being modelled. For example, if a neural network selects a sales promotion program for presentation in a display unit, a success might be defined to be those programs selected for presentation that resulted in a response from a passer-by, such as moving closer to the display unit or interacting with the touch screen of the display unit. The details involved in the training process well-known to those skilled in the art and require no further explanation. See, for example, the reference entitled *Parallel Distributed Processing: Explorations in the Microstructure of Cognition* by D. Rumelhart, J. McClelland, and the PDP Research Group (1986) and *The (New) Turing Omnibus* by A. Dewdney (1993) at pages 181–187 and 241–249.

Figure 5:
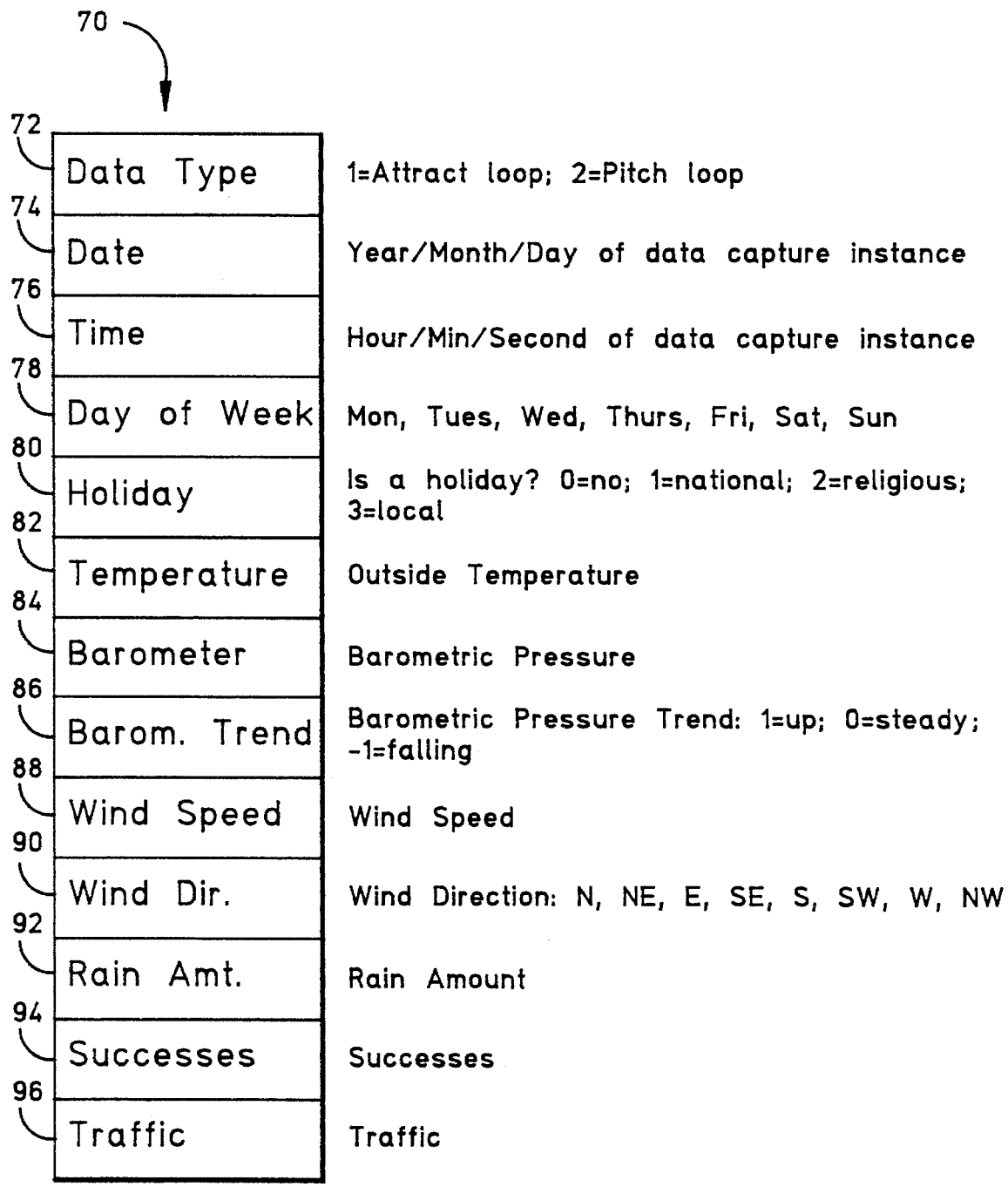
FIG. 5 is a representation of a training record data structure used by the kiosk unit processor illustrated in FIG. 2 for the training of the kiosk unit neural network.

As described above, a neural network must be trained so that it can "learn" the decision criteria that comprise a proper or correct selection from among a set of data input values. FIG. 5 is a representation of a training record data structure 70 having data used in the training of the neural network. The first field 72 of the training record indicates the data type, relating the record either to the attract loop sales promotion program or to the specific loop (also referred to as the "pitch loop" or "sell mode") sales promotion program.

The date field 74 of the training record contains the year, month, and day when the data was recorded. The time field 76 contains the hour, minute, and second of the day on which the data was recorded. Similarly, the day of the week field 78 contains the day of the week when the data was recorded. The holiday field 80 indicates whether the date of recording was a holiday and also indicates the nature of that holiday. That is, a holiday field value of zero indicates no holiday, a holiday field value of one indicates a national holiday, a value of two indicates a religious holiday, and a value of three indicates a local holiday.

The temperature field 82 of the date of record indicates the outside temperature at the time of recording. Similarly, the barometric pressure field 84, barometric trend field 86, wind speed 88, wind direction 90, and rain amount 92 indicate various weather conditions at the time of data recording. The success field 94 contains a count of the number of successful responses recorded by the sensors. A success is defined as a person being detected in the vicinity of the kiosk unit during the presentation of the attract loop and is defined as a touch-screen interaction during the presentation of the sales promotion program. The traffic field 96 contains a count of the number of passers-by in the immediate area of the kiosk unit at the time of data recording.

Figure 6:
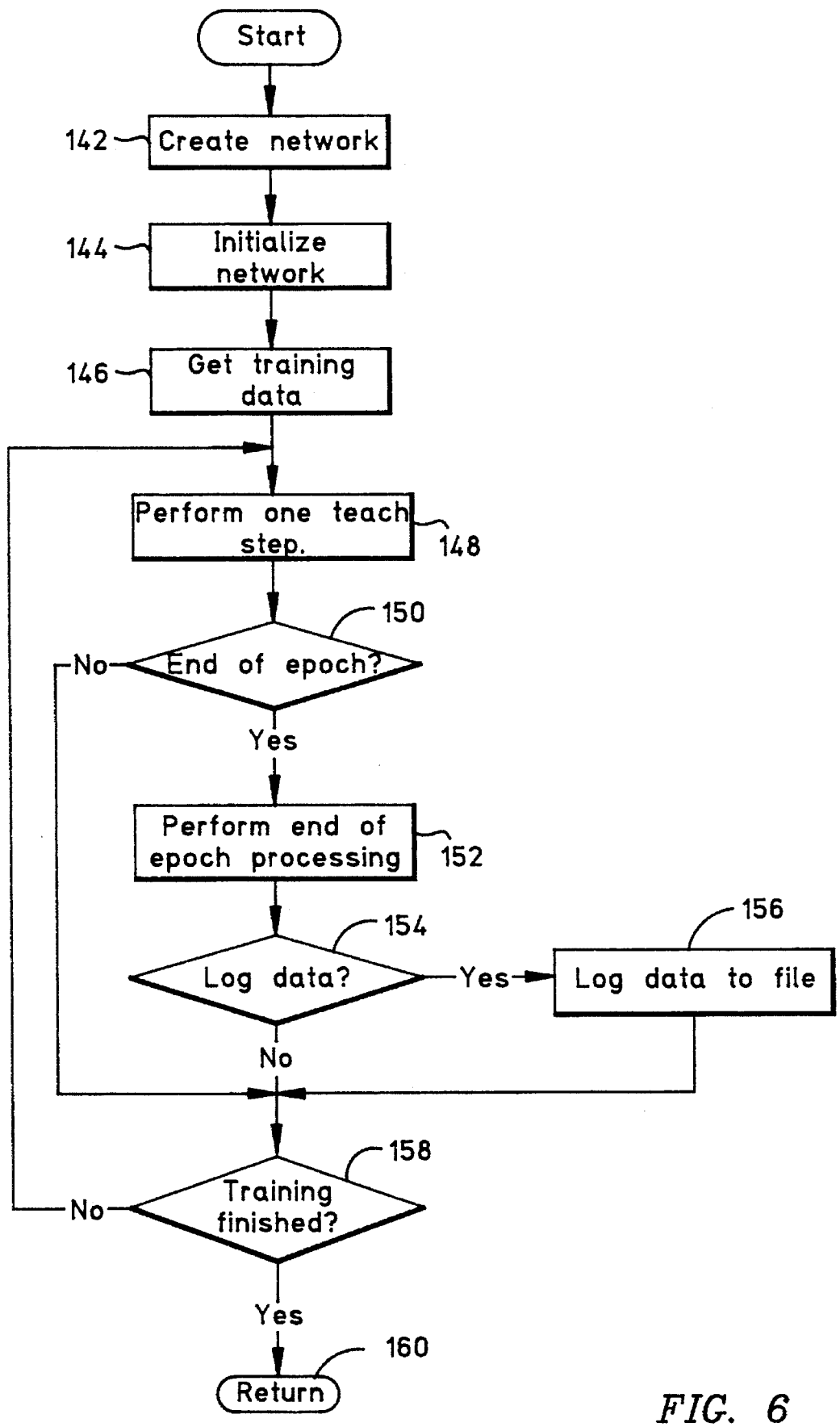
FIG. 6 is a flow diagram that represents the processing steps carried out by the processor illustrated in FIG. 3 in training the neural network.

FIG. 6 is a flow diagram that illustrates the processing steps involved in training the neural network. The first step of the neural network training process as indicated by the flow diagram box numbered 142 is to create the neural network itself. That is, the memory space for the data structures that will contain the network data must be reserved by the processor before the training is begun. In the preferred embodiment, the input data set has a structure as illustrated for the training record and as described above. The next step in the training of the network, as represented by the flow diagram box numbered 144, is to initialize the network. Network initialization comprises, for example, setting the connection matrix values of the network to random values. A variety of schemes can be used to carry out this step, as known to those skilled in the art. Such steps are described with greater particularity in the standard neural network reference work referred to above, entitled *Parallel Distributed Processing: Explorations in the Microstructure of Cognition* by D. Rumelhart, et al.

The next step, represented by the flow diagram box numbered 146, is to get the training data. This step comprises, for example, retrieving a predetermined number of training data records from memory. The number of data records to be used for training comprises a number that is not susceptible to ready quantification but which is known to those skilled in the art as the number of records to be sufficient to provide a desired level of confidence that further processing of training data would not result in appreciably different set of output data. In the preferred embodiment, where each record represents a time interval of fifteen seconds, it has been found that twenty to thirty minutes worth of data is sufficient. The next step, represented by the flow diagram box numbered 148, is to perform what is referred to as a teaching step. This step comprises processing a single training data record of the collected training data and determining the output data set produced by the output layer of the neural network.

The next step, represented by the decision box numbered 150, is to check for the end of the training data file, also referred to as the end of the training epoch. If the end of the file has been reached, an affirmative response, then at the flow diagram box numbered 152, the end of epoch processing is performed. Next, at the decision box numbered 154, a check is made to determine if the data gathered from the training step should be recorded, or logged. If the data is to be logged, an affirmative response, then at the flow diagram box numbered 156, the data is recorded into a log file. After the data has been logged, or if the data need not be logged at box 154, or if the end of the file has not been reached at box 150, then the next step performed is to determine if the training routine has finished, as represented by the decision box numbered 158. If training has not been finished, a negative response, then processing returns to the performing of a teaching step at the box numbered 148. If training has finished, then processing halts and the training routine returns to the main program at the box numbered 160.

Figure 7:
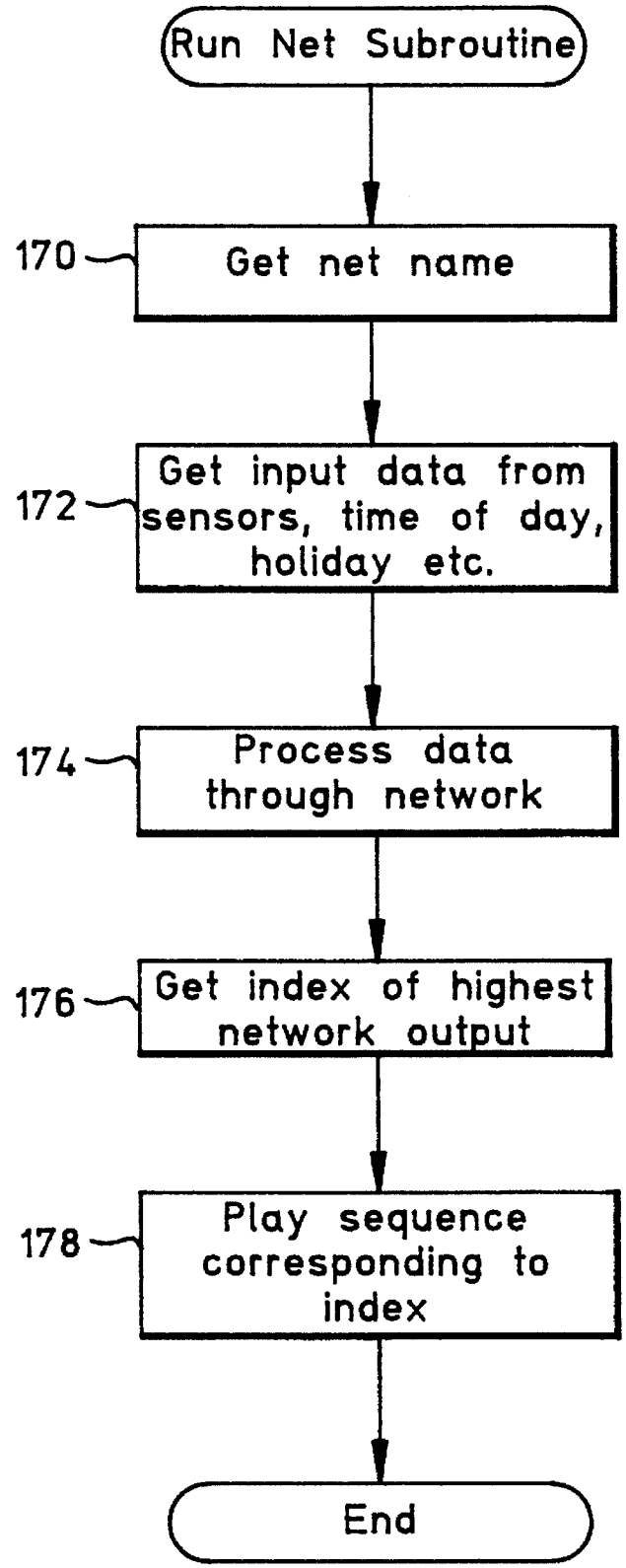
FIG. 7 is a flow diagram that represents the processing steps carried out by the processor illustrated in FIG. 3 after training the neural network.

FIG. 7 is a flow diagram of the processing steps followed by the neural network application program in using the trained neural network. The first step performed by the processor, as indicated by the flow diagram box numbered 170, is to get the name of the neural network to be used, either the attract loop net or the pitch loop. The selection of the loop was described above. The next step at box 172 is to get the input data from the various sensors, time of day circuits, and the like. Next, at the box numbered 174, the input data is processed through the appropriate neural network. That is, a different neural network will be invoked for the attract loop selection and specific loop selection, respectively. The next step represented by the flow diagram box numbered 176 is to get the index of the highest neural network output value. The final step at the flow diagram box numbered 178 is to play the sales promotion program sequence corresponding to the index obtained in the preceding step.

Figure 8:
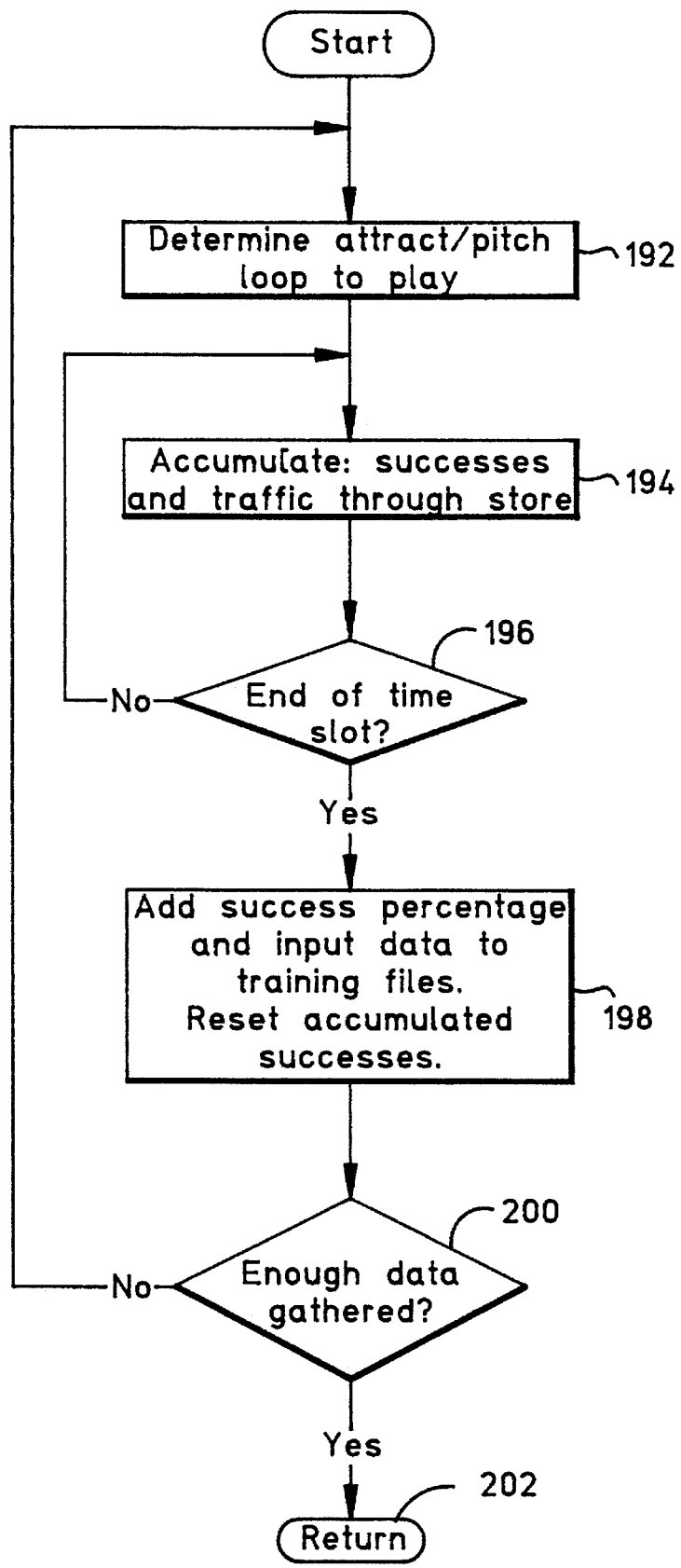
FIG. 8 is a flow diagram that represents the processing steps carried out by the processor in creating the training data for the neural network.

FIG. 8 is a flow diagram that represents the processing carried out by the subroutine that creates the training data for the neural network. The first step of the creation subroutine, represented by the flow diagram box numbered 192, is to determine whether the general attract loop or specific loop sales promotion program will be played. As described above, this is determined by checking the preceding time interval for an interaction with the touch-screen display. The next step, represented by the flow diagram box numbered 194, is to accumulate the successes or touch-screen interactions, and the traffic volume in the immediate area of the kiosk unit. The next step is to check for the end of a time slot, as indicated by the decision box numbered 196. This step comprises, for example, collecting data at 15-second intervals for a time slot of 20 to 30 minutes. If the end of the time slot has not been reached, a negative response at the decision box, then processing returns to the accumulation of data step at box 194. If the end of the time slot has been reached, an affirmative response at the decision box, then the next processing step is to add the success percentage and input data to the training files and to reset the accumulated successes, as indicated by the flow diagram box numbered 198. The next step in the processing is to determine if sufficient data has been gathered to end the training step, as represented by the decision box numbered 200. If the data gathered is insufficient, then processing returns to the flow diagram box numbered 192, where the appropriate sales promotion program is determined. If a sufficient amount of data has been gathered, then processing for the creation of training data is halted and processing returns to the main routine as indicated by the return box numbered 202.

The neural network-determined program selection described above can be applied to a variety of interactive stations. Such stations can include, for example, video game stations, automated teller machines, and vending machines. Similarly, operator input may be received from a variety of devices in addition to touch screens, including joystick controllers, push buttons, coin slots, and voice recognition units.

The present invention has been described above in terms of a presently preferred embodiment so that an understanding of the present invention can be conveyed. There are, however, many configurations for presentation of sales promotion programs not specifically described herein but with which the present invention is applicable. The present invention should therefore not be seen as limited to the particular embodiment described herein, but rather, it should be understood that the present invention has wide applicability with respect to presentation of sales promotion programs generally. All modifications, variations, or equivalent arrangements that are within the scope of the attached claims should therefore be considered to be within the scope of the invention.

We claim:

1. A presentation unit comprising:
   a display touch screen unit that includes a touch screen on which images can be displayed, receives display image information from a sales promotion program, and produces a touch signal in response to a touch at the touch screen;
   at least one positive response sensor that produces a signal that indicates when a person is in an area physically near the presentation unit and responds to the displayed images in a positive manner;
   a speaker that transduces sound front the sales promotion program; and
   a central processing unit having one of said neural network selection program and a plurality of sales promotion programs, wherein the neural network selection program selects one of said sales promotion program for presentation in response to real-time data and signals from the positive response sensor, said presentation of the selected program being displayed by the display touch screen and playbacked by the speaker.

2. A presentation unit as defined in claim 1, wherein the positive response sensor includes a proximity sensor that produces a proximity signal that indicates when a person is in the immediate area of the touch screen and the positive manner of responding comprises a person touching the touch screen.

3. A presentation unit as defined in claim 2, wherein the positive response sensors further include a traffic sensor that produces a traffic index signal that indicates the number of persons in the immediate area of the presentation unit.

4. A presentation unit as defined in claim 2, wherein the central processing unit further contains:
   a set of collected selection data for training the neural network selection program, the selection data including traffic volume data that indicates the number of persons in the immediate area of the touch screen at predetermined times in accordance with randomly selected sales promotion programs presented at the predetermined times.

5. A presentation unit as defined in claim 4, wherein the sales promotion programs include general attract loop sales promotion programs and specific loop sales promotion programs.

6. A presentation unit as defined in claim 5, wherein the set of collected selection data comprises a plurality of data records, each of which includes the current date, current time of day, an index of current traffic in the immediate area, and an index of general attract loop successes at predetermined times.

7. A presentation unit as defined in claim 6, wherein the neural network is trained using a neural network training epoch data subset of the collected selection data comprising a predetermined number of data records.

8. A presentation unit as defined in claim 7, wherein the central processing unit generates a neural network output set of program indexes in response to the collected input data and the general attract loop sales promotion program is selected by the central processing unit in response to the program index having the highest output value.

9. A presentation unit as defined in claim 8, wherein the central processing unit selects a specific loop sales promotion program only after the touch screen of the program presentation unit was touched by a person.

10. A presentation unit as defined in claim 9, wherein the specific loop sales promotion program is selected only if the display touch screen was touched within a predetermined time interval.

11. A presentation unit as defined in claim 6, wherein an attract loop success comprises the number of persons detected in the immediate area of the presentation unit and a specific loop success comprises the number of touch screen interactions in a predetermined time interval.

12. A kiosk unit that presents multimedia sales promotion programs having audio and video programming, the kiosk unit comprising:

a kiosk housing;

a display touch screen unit that is located in the kiosk housing and includes a touch screen on which images can be displayed so the displayed images are visible to passers-by, receives display image information from a sales promotion program, and produces a touch signal in response to a touch at the touch screen;

at least one proximity sensor that produces a proximity signal that indicates when a person is in an immediate area of the touch screen;

a traffic sensor that produces a traffic index signal that indicates the number of persons in the immediate area of the kiosk housing;

a time data subsystem that generates time data comprising date and time-of-day data;

a speaker that transduces sound from the sales promotion programs during playback so the transduced sound can be heard by passers-by; and a central processing unit having a neural network selection program and a plurality of sales promotion programs, wherein the neural network selection program assumes an untrained state in which selection data is collected and assumes a trained state in which the neural network selection program selects a sales promotion program for presentation whenever it is not currently presenting a sales promotion program in accordance with collected selection data said central processing means including means for outputting a presentation of selected sales promotion programs to the touch screen and a playback back to the speaker in response to real-time input data including the time data and collected data signals from the touch screen unit, proximity sensor, and traffic sensor according to said time data subsystem.

13. A kiosk unit as defined in claim 12, wherein the set of collected selection data comprises a plurality of data records, each of which includes the current date, current time of day, an index of current traffic in the immediate area, and an index of general attract loop successes at predetermined times and the collected selection data further includes traffic volume data that indicates the number of persons in the immediate area of the touch screen according to the time data.

14. A kiosk unit as defined in claim 13, wherein the sales promotion programs include general attract loop sales promotion programs and specific loop sales promotion programs.

15. A kiosk unit as defined in claim 14, wherein the central processing unit generates a neural network output set of program indexes in response to the collected input data and the general attract loop sales promotion program is selected by the central processing unit in response to the greatest program index.

16. A kiosk unit as defined in claim 15, wherein the central processing unit selects a specific loop sales promotion program only after the touch screen of the kiosk unit was touched by a person.

17. A kiosk unit as defined in claim 16, wherein the specific loop sales promotion program is selected only if the display touch screen was touched within a predetermined time interval.

18. A kiosk unit as defined in claim 13, wherein an attract loop success comprises the number of persons detected in the immediate area of the kiosk unit and a specific loop success comprises the number of touch screen interactions that occur in a predetermined time interval.

19. A method of dynamically selecting one of a plurality of sales promotion programs for running in a program presentation unit, the method comprising the steps of:

training a neural network that generates an output data set indicating one of the plurality of sales promotion programs to be run in the program presentation unit along with a set of selection data;

providing the trained neural network with current selection data;

detecting if a person is in the area immediately around the program presentation unit;

selecting one of a plurality of general attract loop sales promotion programs with the trained neural network using a set of predetermined system criteria, for running in the program presentation unit, if no person is detected in the immediate area;

selecting a specific loop sales promotion program with the trained neural network in response to real-time data, for running in the program presentation unit, if at least one person is detected in the immediate area; and running the selected sales promotion program in the program presentation unit.

20. A method as defined in claim 19, wherein the step of training the neural network comprises the steps of:

detecting if a person is in an area immediately around the program presentation unit;

randomly selecting a general attract loop sales promotion program if no person is detected in the immediate area;

randomly selecting a sales loop sales promotion program if at least one person is detected in the immediate area;

running the randomly selected program in the program presentation unit;

collecting a set of selection data for training the neural network, the selection data including data relating to the traffic and environment in the immediate area;

repeating the steps of detecting, selecting, and running for a predetermined time interval; and providing the neural network with the collected selection data.

21. A method as defined in claim 20, wherein the step of collecting includes collecting selection data comprising the current date, current time of day, an index of current traffic in the immediate area, and an index of attract loop successes comprising the number of persons detected in the immediate area of the presentation unit.

22. A method as defined in claim 20, wherein the step of providing comprises:

obtaining a first neural network training epoch data subset of the collected selection data;

performing a neural network training process with the data subset of the collected selection data;

obtaining a next neural network training epoch data subset of the collected selection data; and repeating the steps of performing and obtaining until all neural network training epoch data subsets in the collected selection data have been processed.

23. A method as defined in claim 19, wherein the step of selecting a general attract loop sales promotion program comprises the steps of:

collecting a set of selection input data for the neural network;

providing the collected input data to the neural network and generating a neural network output set of program indexes; and selecting the general attract loop sales promotion program corresponding to the greatest program index.

24. A method as defined in claim 19, wherein the step of selecting a sales loop sales promotion program further comprises the step of:

selecting a specific loop sales promotion program with the trained neural network, for running in the program presentation unit, if a touch screen of the program presentation unit was touched by a person.

25. A method as defined in claim 24, wherein the specific loop sales promotion program is selected only if the touch screen was touched within a predetermined time interval.

* * * * *

UNITED STATES PATENT AND TRADEMARK OFFICE
CERTIFICATE OF CORRECTION

PATENT NO. : 5,504,675
DATED : April 2, 1996
INVENTOR(S) : Cragun et al

It is certified that error appears in the above-indentified patent and that said Letters Patent is hereby corrected as shown below:

Column 10, claim 1, line 29, change "front" to --from--;

Signed and Sealed this

Eighth Day of October, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.    : 5,504,675
DATED         : April 2, 1996
INVENTOR(S)   : Cragun et al It is certified that error appears in the above-indentified patent and that said Letters Patent is hereby corrected as shown below:

```
Claim 1, Column 10, Line 28, change "front" to --from--;
         Line 31, delete "one of said" and insert --a--;
         Line 34, change "sales promotion program" to
                 --sales promotion programs"
```

Signed and Sealed this

Nineteenth Day of November, 1996

Attest:

BRUCE LEHMAN

*Attesting Officer*    *Commissioner of Patents and Trademarks*